March 19, 1929.  P. E. FLETCHER  1,705,726
WINDING FOR DYNAMO ELECTRIC MACHINES
Filed Jan. 16, 1926
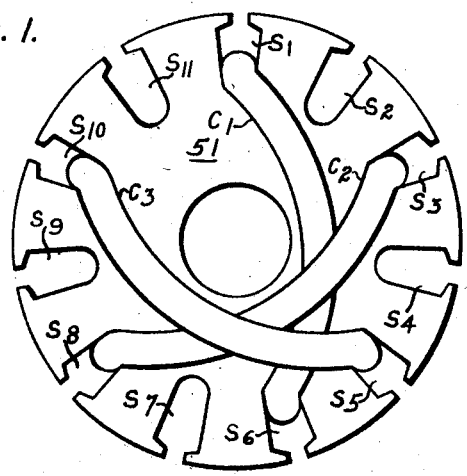
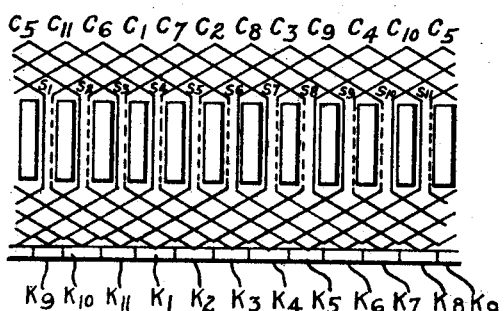
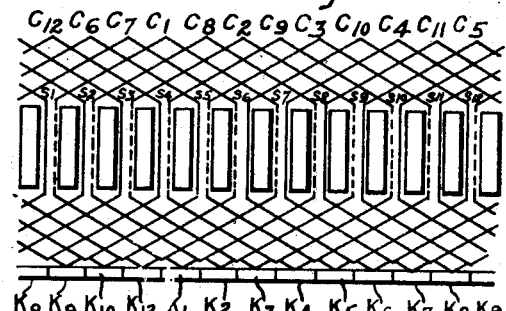
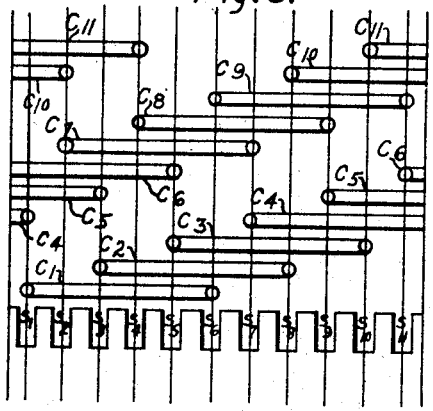
WITNESSES:
INVENTOR
Paul E. Fletcher
BY
Wesley G. Carr
ATTORNEY Patented Mar. 19, 1929.

1,705,726

UNITED STATES PATENT OFFICE.

PAUL E. FLETCHER, OF SPRINGFIELD, MASSACHUSETTS, ASSIGNOR TO WESTINGHOUSE ELECTRIC & MANUFACTURING COMPANY, A CORPORATION OF PENNSYLVANIA.

WINDING FOR DYNAMO-ELECTRIC MACHINES.

Application filed January 16, 1926. Serial No. 81,700.

My invention relates to windings for dynamo-electric machines and it has particular relation to armature windings employed in small hand or lathe wound armatures.

The principal object of my invention is to provide a novel winding for slotted armatures of dynamo-electric machines, and a method of making the same, whereby the winding operations are simplified and a more compact armature is obtained.

In the manufacture of small fractional horsepower motors for the rapidly developing applications of hand tools and household appliances, a continuous effort is being made to obtain a more compact motor and, at the same time, to reduce its cost and increase its efficiency.

In the small series type commutator motors which are extensively utilized in such applications, the cost of the winding of the commutator armature constitutes an important item of the total cost of the motor. While it is clear that the active portion of the winding, which is embodied in the slot, is esesntial for the operation of such motors, it is obvious that any means or method which will simplify, and reduce the cost of, the winding operations, or which will decrease the size of the winding heads outside of the slots, will constitute a material advance in the art. Particularly, a decrease in the size of the coil heads on both sides of the armature will not only render the armature more compact but it will also directly increase the efficiency and the capacity of the motor, since the shortened coils will give a smaller armature resistance, with a resultant decrease of the armature copper losses.

According to my invention, a slotted armature is so wound that a slot is skipped between successively wound coils, thus winding the coils successively in every second slot and continuing so until all the slots are fully wound. The coils are then serially connected into a closed circuit in the geometrical order in which they follow each other upon the periphery of the armature without regard to the sequence followed during the winding operations.

In the accompanying drawings,

Fig. 1 is an end elevational view of a partially wound 11-slot armature made in accordance with my invention, Fig. 2 is a developed diagrammatic view of the armature winding and the associated commutator illustrating the principles followed in making the winding of the armature shown in Fig. 1, Fig. 3 is a diagram illustrating the sequence followed in winding the coils into the slots of the armature shown in Fig. 1, and Figs. 4 and 5 are views similar to Figs. 2 and 3, respectively, illustrating the application of my invention to a 12-slot armature.

Referring to Fig. 1, a cylindrical armature 51 of a dynamo-electric machine is provided with eleven partially closed slots numbered in consecutive order $S_1$ to $S_{11}$.

The type of armature here illustrated is ordinarily employed in small two-pole series motors to which my invention is principally applied, although the principles thereof are applicable to any other pole number or any other type of armature employing similar windings.

The armatures are usually wound on a lathe, either by machine or by hand, a coil being wound into pairs of slots so as to provide two coil sides per slot. Beginning, for instance, in slot $S_1$ and choosing a coil pitch equal five slots, a coil $C_1$ is wound into the bottoms of the slots $S_1$ and $S_6$ until the coil has the requisite number of turns, being about half of the total number of turns per slot.

According to the method of winding employed in the prior art, the next coil would then be wound in the pair of slots immediately following the slot pair $S_1$, $S_6$, but, according to the improved method of winding constituting the subject-matter of my invention, the slots immediately following those carrying the first coil are skipped and the second coil is wound into the next slots, in the present case, in the slots $S_3$ and $S_8$. The third coil is similarly wound into the slots $S_5$ and $S_{10}$, after skipping the slots $S_4$ and $S_9$ immediately following the slots into which the second coil is wound.

This process is continued, progressing around the armature until all the slots are filled with eleven coils, $C_1$ to $C_{11}$, there being two coil sides per slot, as shown in the developed view of the complete winding in Fig. 2. In this figure, the coil-sides lying in the bottoms of the slots are indicated in dotted line, while the coil-sides lying in the tops of the slots are shown in full lines. The sequence of the winding operations appears very clearly from Fig. 3, indicating the succession in which the individual coils $C_1$ to $C_{11}$ are wound into the slots.

When the armature is completely wound, each coil lies in the same slot that it would occupy had the armature been wound according to the practices of the prior art, that is, by progressing from slot to slot completely around the armature without skipping any slots. The individual coils are connected to the commutator in a closed circuit exactly as if they had been wound according to the prior art. The coils which follow each other geometrically around the periphery of the armature are connected in series without regard to the sequence in which they were wound. Thus, the coils are connected in a closed polygon in the sequence $C_1-C_7-C_2-C_8-C_3-C_9-C_4-C_{10}-C_5-C_{11}-C_6-C_1$, while they are wound in the sequence $C_1-C_2-C_3$ etc.

The connections between successively following coils $C_1-C_7$, etc., lead to successive commutator segments $k_1$ to $k_{11}$, as in the prior art. The order in which the various coils are placed in the slots does not in any way change the order in which the starting and finishing leads of the coils appear around the armature core when the armature is completely wound and no change is necessary in laying out the commutator with respect to the coils.

The foregoing "skip-slot" method of winding armatures may be employed either in coils with one strand or a plurality of strands, and it may be employed in windings with one or more conductors in parallel, and for any number of coil-sides per slot. The improved method of winding does not impose any limitation with respect to the choice of the coil pitch, but on the contrary, on account of the more compact arrangement of the coil heads, it is possible to choose the coil pitch with a greater degree of freedom than in the windings of the prior art.

In armatures wound according to my invention the coils are spread out more evenly over the end faces of the armature, the part of the winding which is usually tightly packed around the shaft being more evenly distributed, a part of it being in the place near the periphery, which was not well filled in armatures wound by prior methods.

On account of the smaller extension of the winding heads, the mean length of turn of the coils is shorter and the armature has a smaller total resistance, resulting in reduced losses and a greater output for the same diameter of armature.

The improved method of winding also results in a more uniform distribution of the masses around the periphery, producing more perfectly balanced armatures, a feature which is very important in the high-speed series motors to which this winding is particularly adapted.

The new winding is also more compact than the prior windings, eliminating dead air pockets between the individual coils and improving the rate of cooling of the coils, thus further increasing the capacity of the motor.

Because of the wider angle at which the coil sides leave the slots, the operator can wind the armature much faster than by prior methods, the winding heads are tighter and flatter and the coils require less shaping. The wide angles at which the coil sides leave the slots also reduce the bunching of the wire at the ends of the slots, permitting better utilization of the slot space.

The novel method of winding is applicable to any desired slot number. Thus, in Figs. 4 and 5, I have shown a twelve-slot armature wound with the skip-slot method. Coils $S_1$ to $S_6$, of a five-slot pitch, are wound similar to the eleven-slot armature shown in Figs. 1 to 3, skipping a slot between successive coils. The winding operation is carried on in this manner until half of the coils are wound into the slots, in this case six coils $S_1$ to $S_6$.

The next coil cannot be wound in the ordinary manner by skipping one slot, since, on account of the even number of slots, the coil would lie in the same two slots in which the first coil was wound. To avoid this condition, and in order to make the winding finish properly, the first coil $S_7$ of the second half of the winding is wound in the slot pair adjacent to the slot pair carrying the last coil $S_6$ of the first half of the winding. The other coils of the second half of the winding are then wound by the "skip-slot" method just as the first half of the winding, until all the slots are filled.

As seen above, the "skip-slot" method of winding is applicable to any combination of slots and coil pitches, there being only a slight difference depending on whether the number of slots is odd or even. If the slot number is odd, a slot is skipped between each coil. If the number of slots is even, a slot is skipped between each coil until half of the coils are wound and the next coil is wound in the next slot, the remainder of the coils being then wound like the first half.

I claim as my invention:

1. The method of winding slotted armatures for dynamo-electric machines which comprises winding a coil in one pair of slots, similarly winding a second coil in a pair of slots second removed from said one pair of slots and proceeding progressively until one group of coils is wound around the armature and then continuing to wind a similar second group of coils in the slots omitted in winding the first group.

2. The method of winding slotted armatures for dynamo-electric machines which comprises winding a coil in situ in a pair of slots spaced from each other by the desired pole pitch, skipping the slots next adjacent to the wound pair of slots and similarly winding a second coil in another pair of slots, and continuing to wind coils while skipping the slots following the preceding coil until a group of coils is formed around the entire armature, and then similarly winding another group of coils into the slots skipped while winding said first group.

3. The method of winding slotted armatures for dynamo-electric machines with two coil sides per slot which comprises winding a coil in a pair of slots spaced by the desired coil pitch, winding a similar second coil into a pair of slots second next to said first pair of slots, winding a third similar coil into a pair of slots second next to the slots of the second coil, and proceeding in a similar manner until one half of the coils are wound, and then proceeding similarly to wind the second half of the coils into the slots skipped in winding the first half of the coils.

4. The method of winding slotted armatures for dynamo-electric machines which comprises winding a coil in a pair of slots spaced from each other by the desired coil pitch, skipping the slots next adjacent to the wound pair of slots and similarly winding a second coil in another pair of slots, and continuing to wind coils while skipping the slots following the preceding coil until a group of coils is formed around the entire armature, similarly winding coils into the slots skipped while winding said first group and then connecting said coils in series in the order of their final positions around the periphery of the armature.

5. The method of winding a commutator-type armature for a dynamo-electric machine which comprises winding a coil in a pair of slots spaced from each other by the desired pole pitch, skipping the slots next adjacent to the wound pair of slots and similarly winding a second coil in another pair of slots, and continuing to wind coils while skipping the slots following the preceding coil until a group of coils is formed around the entire armature, similarly winding coils into the slots skipped while winding said first group until the armature is fully wound, serially connecting said coils in a closed circuit in the order in which they follow geometrically around the periphery, and then connecting successive commutator segments to successive points between the coils connected in said closed circuit.

6. The method of winding slotted armatures for dynamo electric machines which consists in winding a coil in situ in a pair of spaced slots, skipping a slot and winding a similar coil in situ in another pair of slots, and then continuing to wind coils in a similar manner on around the armature until all of the slots in the armature are occupied by two coil sides.

7. The method of winding slotted armatures for dynamo electric machines which consists in winding a coil in situ in one pair of slots, winding a similar coil in situ in a pair of slots second removed from said one pair of slots and then continuing to wind coils, in a similar manner, on around the armature until all of the slots have two coil sides therein.

In testimony whereof, I have hereunto subscribed my name this 11th day of January, 1926.

PAUL E. FLETCHER.